(12) United States Patent
Kodaypak

(10) Patent No.: US 10,477,368 B2
(45) Date of Patent: *Nov. 12, 2019

(54) SYSTEM AND METHOD FOR EVENT BASED INTERNET OF THINGS (IOT) DEVICE STATUS MONITORING AND REPORTING IN A MOBILITY NETWORK

(71) Applicant: AT&T INTELLECTUAL PROPERTY I, L.P., Atlanta, GA (US)

(72) Inventor: Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,496

(22) Filed: Sep. 11, 2018

(65) Prior Publication Data

US 2019/0014458 A1   Jan. 10, 2019

Related U.S. Application Data

(63) Continuation of application No. 15/169,699, filed on May 31, 2016, now Pat. No. 10,104,567.

(51) Int. Cl.
*G01R 31/08* (2006.01)
*H04L 1/00* (2006.01)
(Continued)

(52) U.S. Cl.
CPC .......... *H04W 4/70* (2018.02); *H04L 12/2803* (2013.01); *H04L 41/022* (2013.01);
(Continued)

(58) Field of Classification Search
CPC combination set(s) only.
See application file for complete search history.

(56) References Cited

U.S. PATENT DOCUMENTS 6,574,241 B2   6/2003   Vasarainen
6,724,883 B1   4/2004   Lehtinen
(Continued)

FOREIGN PATENT DOCUMENTS

EP   2693776 A1   2/2014
WO   2015153589 A1   10/2015
(Continued)

OTHER PUBLICATIONS

3GPP (ETSI TS 123 682 V13.5.0, Apr. 2016, Digital cellular telecommunications systems, Phase 2+ GSM) (Year: 2016).*

(Continued)

*Primary Examiner* — Maharishi V Khirodhar
(74) *Attorney, Agent, or Firm* — Amin, Turocy & Watson, LLP

(57) ABSTRACT

Protocol agnostic wrapping (PAW) and/or data analytics engine (DAE) functions are embedded within a service capability exposure function (SCEF) entity for handling dynamic device triggering, event monitoring, and/or reporting of Internet of things (IoT) devices. The enhanced SCEF creates a dynamic mobility network infrastructure model for global IoT connectivity and new services delivery. The PAW function can be utilized for enhancing massive IoT devices connectivity with their respective application servers in the next-generation mobility network. By employing the PAW function, the SCEF can generate and securely expose flexible application programming interfaces (APIs) to the external network of various third party IoT application service providers, which in turn can utilize the APIs to access their targeted IoT devices via network elements and extract critical device and network capabilities on an event basis.

20 Claims, 12 Drawing Sheets

(51) Int. Cl.
  *H04L 12/16* (2006.01)
  *H04W 4/70* (2018.01)
  *H04W 24/08* (2009.01)
  *H04L 29/08* (2006.01)
  *H04L 12/28* (2006.01)
  *H04W 8/02* (2009.01)
  *H04W 24/10* (2009.01)
  *H04L 12/24* (2006.01)
  *H04L 12/26* (2006.01)

(52) U.S. Cl.
  CPC ........ *H04L 43/065* (2013.01); *H04L 67/1002* (2013.01); *H04L 67/12* (2013.01); *H04L 67/20* (2013.01); *H04L 67/22* (2013.01); *H04L 67/306* (2013.01); *H04W 8/02* (2013.01); *H04W 24/08* (2013.01); *H04W 24/10* (2013.01)

(56) References Cited

U.S. PATENT DOCUMENTS

| | | | |
|---|---|---|---|
| 7,844,745 | B1 | 11/2010 | Darbyshire et al. |
| 7,895,256 | B2 | 2/2011 | Zombek et al. |
| 8,090,856 | B1 | 1/2012 | Bonefas et al. |
| 8,264,947 | B1 | 9/2012 | Tavares |
| 8,325,614 | B2 | 12/2012 | Poon et al. |
| 8,737,989 | B2 | 5/2014 | Luft |
| 9,049,104 | B2 | 6/2015 | Zhu |
| 9,202,055 | B2 | 12/2015 | Yegin et al. |
| 9,270,559 | B2 | 2/2016 | Raleigh et al. |
| 9,606,817 | B1 | 3/2017 | Efstathopoulos |
| 9,641,958 | B2 | 5/2017 | Lehane et al. |
| 10,104,567 | B2 * | 10/2018 | Kodaypak ............... H04W 4/70 |
| 2002/0181501 | A1 | 12/2002 | Nova et al. |
| 2006/0035631 | A1 | 2/2006 | White et al. |
| 2011/0016514 | A1 | 1/2011 | De Carlo et al. |
| 2012/0164954 | A1 | 6/2012 | Karampatsis et al. |
| 2014/0189001 | A1 | 7/2014 | Tyagi et al. |
| 2014/0359035 | A1 | 12/2014 | Wang et al. |
| 2015/0264512 | A1 * | 9/2015 | Jain ........................ H04W 4/70 370/328 |
| 2016/0007316 | A1 | 1/2016 | Vaidya et al. |
| 2016/0036764 | A1 | 2/2016 | Dong et al. |
| 2016/0044651 | A1 | 2/2016 | Lu |
| 2016/0249278 | A1 | 8/2016 | Qi et al. |
| 2016/0278147 | A1 * | 9/2016 | Adrangi ................. H04W 4/70 |
| 2018/0070268 | A1 * | 3/2018 | Iwai ....................... H04W 8/00 |
| 2018/0092133 | A1 * | 3/2018 | Starsinic ................ H04W 4/08 |
| 2018/0270236 | A1 * | 9/2018 | Yu .......................... H04L 29/08 |

FOREIGN PATENT DOCUMENTS

| | | | |
|---|---|---|---|
| WO | 2015191835 | A1 | 12/2015 |
| WO | 2015200801 | A1 | 12/2015 |
| WO | 2016004011 | A1 | 1/2016 |
| WO | 2016014642 | A1 | 1/2016 |

OTHER PUBLICATIONS

"Optimizations in Machine type communications for sensor Data Networkin", Apr. 2016 by Syed husain et al (Year: 2016).*

"Developing Solutions for the Internet of Things," White Paper, iotsworldcongress.com, Intel®, 2014. Retrieved Mar. 9, 2016. http://www.iotsworldcongress.com/wp-content/uploads/2016/01/developing-solutionsfor-iot-Intel.pdf. 12 pages.

Novo, Oscar, et al., "Capillary networks—bridging the cellular and IoT worlds," Internet of Things (WF-IoT), 2015 IEEE 2nd World Forum, IEEE, 2015. Retrieved Mar. 9, 2016. http://www.ericsson.com/res/docs/2015/capillary-networks-bridging-the-cellular-and-iotworlds.pdf. 8 pages.

Kohler, Marcus, Dominic Worner, and Felix Wortmann, "Platforms for the internet of things—an analysis of existing solutions," http://cocoa.ethz.ch/downloads/2013/12/1682_20130918%20-%20MKWI_17.pdf. Retrieved Mar. 9, 2016, 14 pages.

"Connect to Any Product Using Any Device, Over Any Communication Channel (Cellular Networks, the Internet, WiFi, or Satellite), for Any Application," PTC®, ptc.com, accessed: Feb. 2016, retrieved Mar. 3, 2016. http://www.ptc.com/axeda/product/iot-connectivity. 4 pages.

Weichselbaum, Paul, "Tech Support for the Internet of Things," Harvard Business Review, plumchoice.com, Mar. 31, 2015. Retrieved Mar. 9, 2016. http://www.plumchoice.com/wp-content/uploads/2015/05/PlumChoice_HBR_Who-Provides-Tech-Support-in-IoT.pdf. 9 pages.

Office Action dated Jan. 19, 2018 for U.S. Appl. No. 15/169,699, 35 pages.

* cited by examiner

SYSTEM AND METHOD FOR EVENT BASED INTERNET OF THINGS (IOT) DEVICE STATUS MONITORING AND REPORTING IN A MOBILITY NETWORK

RELATED APPLICATION

The subject patent application is a continuation of, and claims priority to, U.S. patent application Ser. No. 15/169,699, filed May 31, 2016 and entitled "SYSTEM AND METHOD FOR EVENT BASED INTERNET OF THINGS (IOT) DEVICE STATUS MONITORING AND REPORTING IN A MOBILITY NETWORK," the entirety of which application is hereby incorporated by reference herein.

TECHNICAL FIELD

The subject disclosure relates to wireless communications, e.g., a system and method for event based Internet of things (IoT) device status monitoring and reporting in a mobility network.

BACKGROUND

The Internet of Things (IoT) holds a great promise for the future of the global communications industry. The connectivity of humans and machines (e.g., smart phones, tablet computers, home appliances, etc.) via high-speed mobile internet technologies such as Long Term Evolution (LTE), LTE-Advanced (LTE-A) and its evolution, forms the basis for a successful global IoT implementation. As the number of connected devices that are capable of establishing connectivity with other devices and/or passive objects to exchange data continues to rise steadily, the IoT technology gains widespread proliferation in the information technology industry. IoT enables creation of an information-rich eco-system that can enrich modern connected way of life and transform the way in which businesses as well as consumers function today.

With the advent of several new competing wireless technologies, global operators as well as third party application/service providers are driving to enhance the mobile IoT devices connectivity model utilizing complementary radio access schemes and efficiently transporting the resulting digitized data via a suitable core transport networking gear. The number of such autonomous connected "things" is expected to grow to 20+ billion by 2020, per Global Industry Analyst's reports.

The ability to connect mobile IoT devices across various industry verticals with traditional smartphones, humans, and other key passive objects over Internet, as well as collect and analyze the raw data produced by an eco-system of such IoT devices, and transform the resulting raw data into usable information makes IoT the next major technology disruptor in creating a truly globally connected world. Such an ability to connect massive number of IoT devices creates new challenges for the networking infrastructure providers to develop innovative and intelligent networking solutions that can deliver optimal connectivity as well as end user service quality.

DETAILED DESCRIPTION

Figure 1:
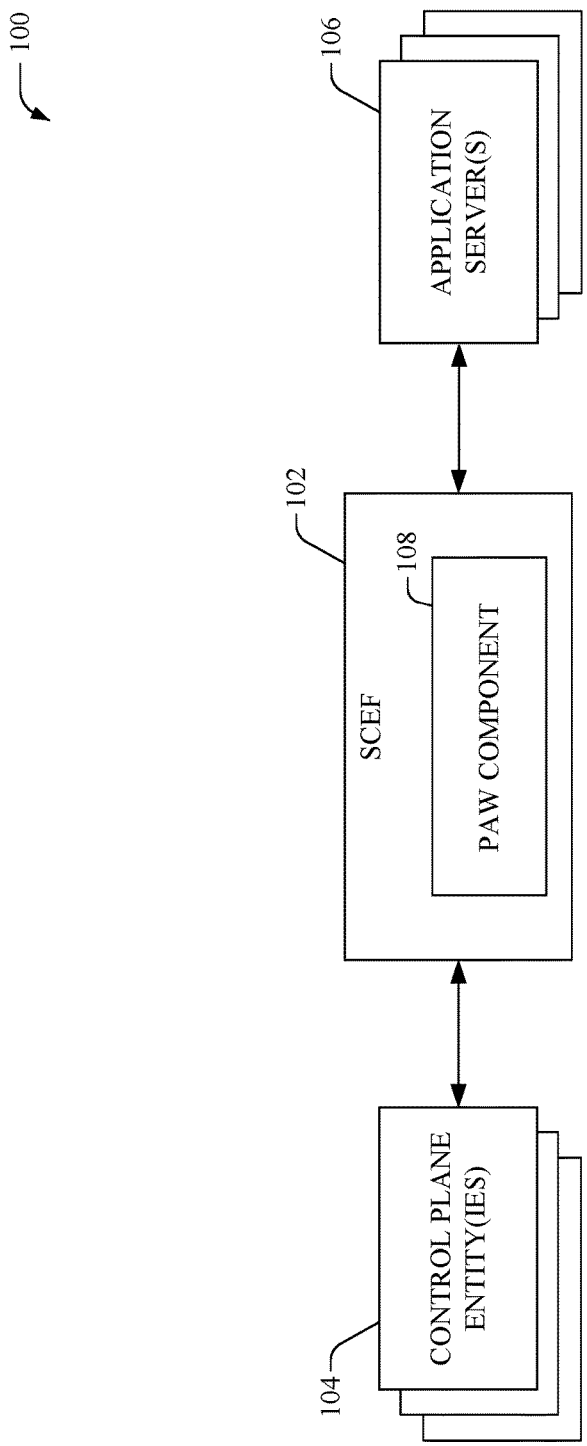
FIG. 1 illustrates an example system that facilitates event-based Internet of things (IoT) device status monitoring and/or reporting.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "engine," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth. Further, it is noted that the term "downstream" as used herein refers to a direction in which data sent for a "stream" flowing from a network service provider device (or content provider device or application provider device) to a user device. As an example, if a first device is closer to (fewer hops away from) the network service provider device than a second device, then the first device is said to be upstream from the second device or conversely, the second device is downstream from the first device.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

As the number of connected devices that are capable of establishing connectivity with other devices and/or passive objects to exchange data continues to rise steadily over the high-speed mobile Internet, the Internet of Things (IoT) technology gains widespread proliferation in the information technology industry. IoT, which is the future of internet connectivity, enables creation of an information rich ecosystem that can enrich modern connected way of life and transform the way in which businesses as well as consumers function today.

With the advent of several new competing wireless technologies such as SIGFOX/LoRa wide area network (WAN)™/Low-Power, Wide-Area (LPWA)/Narrow Band cellular IoT/enhanced machine type communication (eMTC), etc., global operators as well as third party application/service providers are driving to enhance the mobile IoT devices connectivity model utilizing such complementary radio access schemes and efficiently transport the resulting digitized data via a suitable core transport networking gear. The systems and methods disclosed herein provide efficient control plane based device triggering, monitoring, and/or message exchange mechanisms to establish high-speed mobile connectivity associated with such a massive number of IoT devices in an operator's mobility network. Control plane based messages are exchanged over multiple signaling interfaces, undergoing multiple layers of protocol conversion when interacting with a service capability exposure function (SCEF), depending on the applications, before a request from a third party IoT application server reaches the IoT device and vice-versa. In one embodiment, a SCEF is disclosed herein that expedites such IoT message exchanges by employing a protocol agnostic wrapper (PAW) function. Moreover, the PAW function simplifies the interface connectivity between the various network elements, the SCEF, and an external provider's reachability model, thereby facilitating rapid and direct access to the network. This direct connectivity approach avoids traversing through multiple interface protocol conversions between a set of standard network elements and thus minimizes the overall control plane signaling required to reach the IoT devices. In addition, the wrapper function provides flexibility to expose a configurable and selected set of APIs to the external providers based on one or more operator defined service agreements. In one aspect, it is noted that the PAW function wrapper can be a broad protocol to API translation function and can be independent of underlying access technologies.

Lack of a PAW function within the SCEF to expose a generic set of APIs for multiple application layer signaling protocols towards the external providers results in an inefficient mobility network design and targeted network element access that could result in IoT service impacts across multiple service providers. Lack of adequate analytics capabilities within the SCEF on a per protocol conversion per network element will not adequately expose the services and capabilities of the underlying network. This can lead to multi-access based mobility core network architectures with critical interworking entities that are not inherently flexible and dynamically reconfigurable to provide specific event based configuration, monitoring and reporting information about the incumbent IoT devices served by the network provider, thereby not addressing the demands of service providers. Additionally, this can result in direct revenue loss for several network operators which otherwise could have benefited from delivery of new services with the introduction of new IoT devices into the market.

Referring initially to FIG. 1, there illustrated is an example system 100 that facilitates event-based Internet of things (IoT) device status monitoring and/or reporting, according to one or more aspects of the disclosed subject matter. The ability to connect mobile IoT devices across various industry verticals with traditional smartphones, humans, and other key passive objects over Internet, as well as collect and analyze the raw data produced by an eco-system of such IoT devices, and transform their resulting raw data into usable information makes IoT the next major technology disruptor in creating a truly globally connected world. Such an ability to connect a massive number of IoT devices creates new challenges for the networking infrastructure providers to develop innovative and intelligent networking solutions that can deliver optimal connectivity as well as end user service quality. To overcome these challenges, system 100 employs a service capability exposure function (SCEF) component (referred to herein as SCEF 102) that acts as an IoT gateway and/or proxy to a communication network (e.g., a cellular network).

In one aspect, the SCEF 102 can provide a secure connection between control plane entity(ies) 104 of the communication network and application server(s) (AS(s)) 106. As an example, the AS(s) 106 can comprise third party IoT service providers such as vertical industry, government, and/or enterprise services, over-the-top content (OTT) providers, and/or other application and/or service providers. As an example, the control plane entity(ies) 104 can comprise, but are not limited to, an MME and/or a Serving GPRS Support Node (SGSN), a home subscriber server (HSS), a policy and charging rules function (PCRF), a broadcast multicast service center (BMSC), a machine type communication-interworking function (MTC-IWF), a serving call session control function (S-CSCF), a radio access network (RAN) congestion awareness function (RCAF), etc., that are coupled to the SCEF 102 via respective interfaces (e.g., T6a, T6b, S6t, Rx, Nt, MB2, Tsp, ISC, Ns, etc.). Most often, the interfaces can be specified by industry standards, for example, 3GPP standards. In one aspect, the SCEF 102 securely exposes these interfaces to the AS(s) 106 via appropriate, standardized, and/or reconfigurable application programming interfaces (APIs). Typically, the SCEF 102 can be deployed within the trusted domain of a network operator of the communication network, while the application can belong to the trusted domain or can lie outside the trust domain.

In some embodiments, the SCEF 102 can abstract services from the underlying network interfaces and/or protocols and allow the AS(s) 106 to access the network infrastructure (or portions of the network infrastructure). Accordingly, the AS(s) 106 can target specific services to specific set of user equipment (UE) with specific capabilities, for example, located within a given geographical area. Typically, the UE can comprise IoT/machine-to-machine (M2M) devices such as, but not limited to, most any LTE-based appliance, machine, and/or device. As an example, IoT/M2M devices comprise one or more sensors and/or a radio frequency identification (RFID) reader, and are typically employed for automated data transmission and/or measurement between mechanical and/or electronic devices. However, it is noted that the UE is not limited to an IoT/M2M device and can also comprise most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, etc. It is noted that the UE can be mobile, have limited mobility and/or be stationary.

Typically, IoT/M2M devices can have different characteristics than regular UEs (e.g., non-M2M devices, such as smart phones, tablet computers, personal computers, etc.). For example, the IoT/M2M devices generally generate a much greater number of signaling connections in the mobile core network as compared to regular UEs. Further, in another example, the service provider often performs simultaneous device triggering and monitoring for targeted IoT applications and services. The SCEF 102 can provide various enhancements to conventional entities that expose various network elements using several APIs towards external service providers to effectively deal with the IoT/M2M devices communication and their eco-system.

In the downstream direction, the SCEF 102 connects with several control plane network entity(ies) 104 via dedicated signaling interfaces that can utilize different application and transport layer protocols. In the upstream direction, the SCEF exposes the control plane network entity(ies) 104 via a set of standardized and/or customized APIs and/or secure policies to the external AS(s) 106. According to an aspect, in order to securely expose a given control plane network entity(ies) 104 to the external AS(s) 106 for access, the SCEF 102 can map the underlying application layer protocol and its detailed systemic attributes into a suitable data set that could be exposed via an API to the external application processing entity.

If multiple control plane network entity(ies) 104 and their signaling interfaces are to be exposed via dedicated APIs to an external entity, complexity and inefficiency in conventional SCEF design is significantly increased. Moreover, in a large operator environment, there typically exist, pools of network elements that deliver mobility functions and services to a large number (e.g., millions) of users and their devices. IoT traffic adds to the control plane signaling transactions that need to be handled by these standardized network elements across several signaling interfaces. Handling individual protocol conversions from each of the network elements in a given pool as well as across several pools and exposing them via dedicated APIs to multiple service providers can be an onerous and inefficient task. In one aspect, the SCEF 102 comprises a protocol agnostic wrapping (PAW) component 108 that can dynamically handle such massive IoT traffic evolution in an intelligent manner so that normal mobility services are not impacted.

According to an embodiment, the PAW component 108 provides an intelligent wrapping function that can wrap application layer protocols associated with dedicated signaling interfaces to a standardized set of APIs that can be interfaced with the external AS(s) 106 to be able to gain easy access to the communication network. Moreover, the PAW component 108 can present any interface implemented by the network to the external AS(s) 106 as a unique and reconfigurable API. As an example, the external AS(s) 106, by employing the flexible APIs exposed via the PAW component 108, can communicate with their targeted IoT devices via specific network elements to extract critical device and/or network capabilities on an event basis. As an example, the extracted information can be utilized by the AS(s) 106 to deliver new services to such IoT devices on demand. Moreover, the PAW component 108 can perform protocol to API conversion monitoring operations that help in effective routing of the bidirectional traffic between a targeted network element (e.g., control plane entity 104) and service providers (e.g., AS 106) to gain access to the digitized information associated with desired set of IoT devices.

Figure 2:
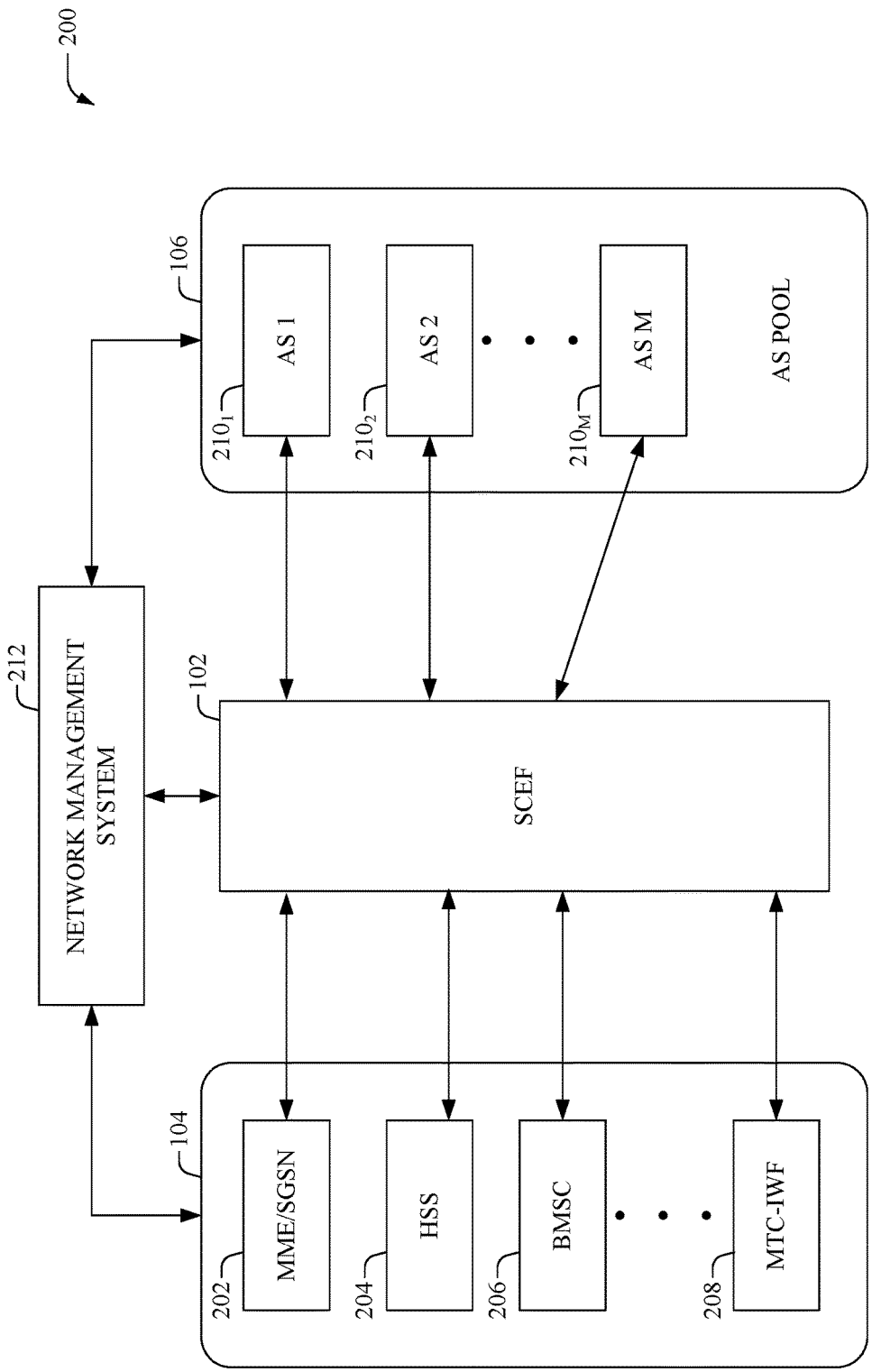
FIG. 2 illustrates an example system for dynamic application programming interface (API) exposure in a pooled configuration.

Referring now to FIG. 2, there illustrated is an example system 200 for dynamic API exposure in a pooled configuration, in accordance with an aspect of the subject disclosure. It is noted that the SCEF 102, control plane entity(ies) 104, and AS(s) 106 can comprise functionality as more fully described herein, for example, as described above with regard to system 100. Further, although system 200 is described with respect to a 3GPP LTE network, it is noted that the subject disclosure is not limited to 3GPP LTE networks and can be utilized in most any communication network.

LTE-based IoT devices upon powering up for the first time try to attach to the mobility management entity (MME) 202 in the mobility core network. Once the MME 202 receives such requests for connection establishment, it extracts the IoT devices capabilities and authenticates them with their home subscriber server (HSS) 204, for example, via routing through diameter routing agents (DRA) using an S6a diameter signaling interface. In doing so, the MME 202 can complete the required diameter signaling transactions and then accept IoT device attachments.

The SCEF 102 adds to the overall mobility core network complexity. For example, the SCEF 102 can support several different signaling interfaces towards existing (and/or future) downstream network elements/functions, such as, but not limited to the MME (and/or SGSN) 202, the HSS 204, a Broadcast Multicast Service Center (BMSC) 206, a machine type communication interworking function (MTC-IWF) 208, etc. The SCEF 102 can expose the 3GPP network elements (e.g., MME 202, HSS 204, BMSC 206, MTC-IWF 208, etc.) via secure policies (e.g. configured by the network provider) and APIs to the external and/or third party AS s and/or service providers, for example, AS 1-AS M (wherein M is most any positive integer) $210_1$-$210_M$ that are within an AS pool. By doing so, the SCEF 102 allows the application providers to implement device triggering, device monitoring, and/or group message delivery for the IoT device, and/or to obtain status reports of the IoT devices' location and/or network conditions on demand and subject to appropriate operator specific agreements in place. Moreover, using the APIs, the application providers, AS 1-AS M $210_1$-$210_M$, can access specific portions of the network elements (e.g., MME/SGSN 202, HSS 204, BMSC 206, MTC-IWF 208, etc.) to extract specific information of their IoT devices and can publish and/or provide targeted and intelligent services to the IoT devices based on the extracted information.

The number of APIs that are to be generated against each of the network elements (e.g., MME/SGSN 202, HSS 204, BMSC 206, MTC-IWF 208, etc.) with unique application layer protocols for dedicated signaling interfaces along with their supported mandatory and optionally configurable information elements is substantially large, and the resulting protocol conversion per network element per interface makes the SCEF 102 a critical network element in the IoT/MTC network architecture. As each network element and its pooled configuration interfaces with a common SCEF entity, the mobility network has a huge dependency on the SCEF 102. In an embodiment, the SCEF 102 employs (e.g., by utilizing the PAW component 108) efficient protocol conversion schemes to expose these interfaces via generic and reconfigurable APIs in a protocol-independent manner to AS 1-AS M $210_1$-$210_M$.

As the IoT industry matures with the technological development and standardization of a variety of IoT device models (e.g., 3GPP UE category types such as CAT1/CAT0/CATM and/or others with configurable features via software upgrades) that support a multitude of applications, services across industry verticals, the resulting mobile connectivity traffic model changes radically. The desire and demand to get these devices connected online creates a huge opportunity for the mobile operators to drive innovative features into their network elements such as the SCEF 102. With virtualization of existing mobility network functions and creation of new network functions, the SCEF 102 has the onus of interworking with both physical and virtual network functions to be able to expose signaling interfaces from each of these underlying physical/virtual networking entities to AS 1-AS M $210_1$-$210_M$ in a secure manner. The SCEF 102 employs a PAW function (e.g., via PAW component 108) to provide intelligent, flexible, and dynamic network architectures with integrated software defined policies that can help both network operators as well as service/application providers in delivering the best in class IoT infrastructure that is scalable, delivers superior end user quality of experience, and/or improves the revenue engine by creating new service models, thereby meeting and exceeding their business objectives. Moreover, the PAW function can comprise a control system that takes as the input, "application layer signaling protocols" from its underlying physical/virtual network elements (e.g., MME/SGSN 202, HSS 204, BMSC 206, MTC-IWF 208, etc.) that are connected and delivers as the output, "generic set of APIs" that are interface agnostic to the external application provider (e.g., AS 1-AS M $210_1$-$210_M$). As an example, the external application provider in turn can use these APIs to perform on demand triggers for desired set of IoT devices in a given geographic region, as well as request event based configuration, reporting, status monitoring, deletion, new services rollout with an existing device or launch of new devices in specific locations given the capabilities supported in the network.

Referring back to FIG. 2, there illustrated are network elements MME 202, HSS 204, BMSC 206, and MTC-IWF 208 that are coupled to the SCEF 102 via various interfaces like S6t, T6a, T6b etc. Developing and exposing an API for each of these various interfaces of the different network elements can be very complex. Thus, the PAW function of SCEF 102 can convert any of the interfaces into a unique and reconfigurable API, for example, a standards based API (e.g., representational state transfer (REST)-based, open mobile alliance (OMA)-based, GSMA-based, etc.). In one aspect, the API can be reconfigurable with intelligence within the SCEF 102, for example, on a per interface basis. Moreover, a reconfigurable API is an API that is dynamically created (e.g., on-the-fly, in real-time, etc.) by the SCEF 102 based on an analysis of various parameters related to real-time traffic, such as, but not limited to, amount of traffic received by the SCEF 102, type of traffic received by the SCEF 102, network element that is sending the traffic to the SCEF 102, interface over which the SCEF 102 receives the traffic, etc. For example, the if there are 1 million IoT users trying to attach to MME 202 and they want to send information to AS 1 $210_1$ of an automotive manufacturer on a first day, the SCEF 102 can utilize this information and generate an API that will be configurable only as a T6a API (e.g., and not be configurable as a S6t or other non-T6a type API) that is employed by the MME 202. On a second day (or at another time), the SCEF 102 can configure the resources as another API, for example, a S6t API if determined that another application server AS M $210_M$ is trying to extract subscription data from the HSS 204. Thus, in this example scenario, all the information coming in on S6t interface to the SCEF 102 can be spun out as an S6t API.

It is noted that the SCEF 102 can continuously monitor its resources and implement mechanisms to avoid being saturated. In some example cases, more than one API can be generated (e.g., simultaneous or substantially simultaneous), for example, depending on demand and/or health conditions of the SCEF 102. Further, the SCEF 102 can be a single vendor or multiple vendor entity. The example scenario wherein the SCEF 102 is multiple vendor entity can be more complicated and a network management system 212 can be utilized to manage operations between the SCEF 102, network element(s) 104, and/or the AS(s) 106. The multi-vendor SCEF 102 can communicate with a plurality of different vendors such as MME vendors, SGSN vendors, and the like, and can generate different APIs that are exposed to the application servers in a pool (e.g., AS 1-AS M ($210_1$-$210_M$)).

AS 1-AS M ($210_1$-$210_M$) can comprise most any application servers distributed over one or more industry segments; for example, IoT specific servers, industrial servers, e-health servers, fleet transportation servers, shipping or mailing servers, automotive servers, and the like. The data requirements of the AS 1-AS M ($210_1$-$210_M$) are typically different based on the information that is to be leveraged from the 3GPP network. For example, an automotive manufacturer AS would like to get updates on car readings on T6 interface since MME 202 would know the location of the connected car. In this example scenario, the AS can send a trigger to the MME 202 via an API exposed by the SCEF 102 and the MME 202 can respond with data over the T6a interface, which can be provided to the AS by the SCEF 102 via an appropriate and dynamically generated API.

Figure 3:
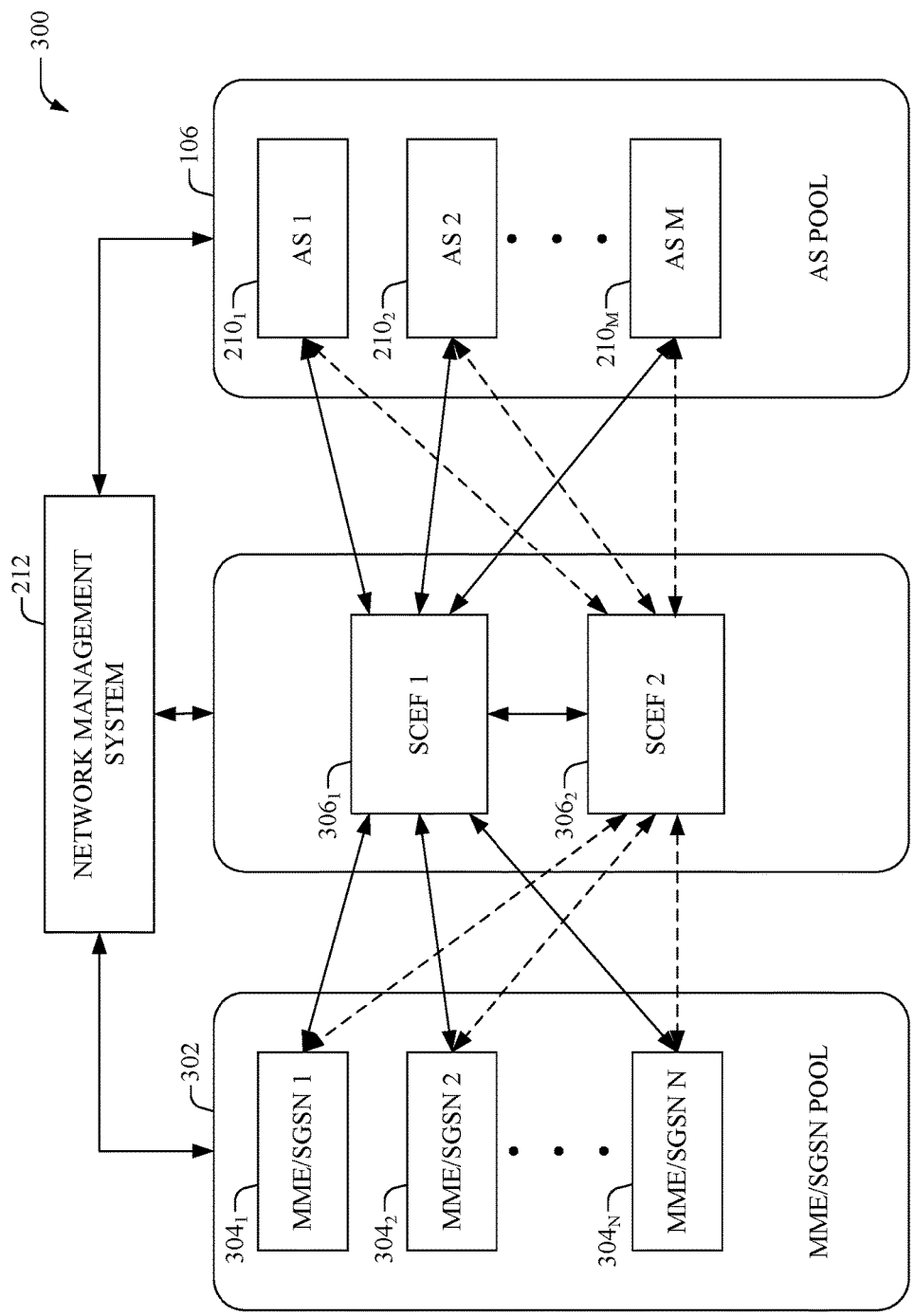
FIG. 3 illustrates an example system for a policy-based dedicated interface to API exchange associated with control-plane entities deployed in a pooled configuration.

Referring now to FIG. 3, there illustrated is an example system 300 for a policy-based dedicated interface to API exchange associated with control-plane entities deployed in a pooled configuration, in accordance with an aspect of the subject disclosure. In one example, MMEs can establish diameter connections over a T6a interface towards a pre-provisioned SCEF entity. In 3G networks, SGSNs can establish connections towards the SCEF entity via a T6b interface. In a simpler core network design, the MME/SGSN network elements (segregated or a combined entity) can be directly connected to the SCEF entity which facilitates simpler connectivity as well as rapid exchange of the T6a/T6b diameter signaling transactions. However, larger operator environments can comprise several regional pools of control plane entities, for example, MME/SGSN pool 302 that has N entities-MME/SGSN $304_1$-$304_N$ (where N is most any natural number greater than 1) in a single pooled configuration. Each MME/SGSN pool 302 can be served by more than one SCEF entity, for example, SCEF 1 $306_1$ and SCEF 2 $306_2$ that address the traffic demands emanating from the massive number of IoT devices in a given wider geographic region served by the MME/SGSN pool 302. It is noted that SCEF 1 $306_1$ and SCEF 2 $306_2$ can be substantially similar to SCEF 102 and can comprise functionality as more fully described herein, for example, as described above with regard to SCEF 102. In one aspect, SCEF 1 $306_1$ can operate in an active mode while SCEF 2 $306_2$ can be in a standby mode. At most any time, for example, periodically and/or in response to an event, the operating modes of the SCEF 1 $306_1$ and SCEF 2 $306_2$ can be switched, such that SCEF 2 $306_2$ can operate in an active mode while SCEF 1 $306_1$ can be in a standby mode. During the active mode, the SCEF can dynamically generate and expose reconfigurable APIs for traffic received from the MME/SGSN pool 302. In an alternative aspect, both SCEFs, SCEF 1 $306_1$ and SCEF 2 $306_2$ can simultaneously operate in the active mode and implement load sharing to efficiently handle the traffic received from the MME/SGSN pool 302.

It is noted that the MME/SGSN $304_1$-$304_N$ can be substantially similar to MME/SGSN 202 and can comprise functionality as more fully described herein, for example, as described above with regard to MME/SGSN 202. Further, it is noted that the AS(s) 106 and the network management system 212 can comprise functionality as more fully described herein, for example, as described above with regard to systems 100-200. Additionally, although system 300 is described with respect to a LTE network, it is noted that the subject disclosure is not limited to LTE networks and can be utilized in most any communication network.

Figure 4:
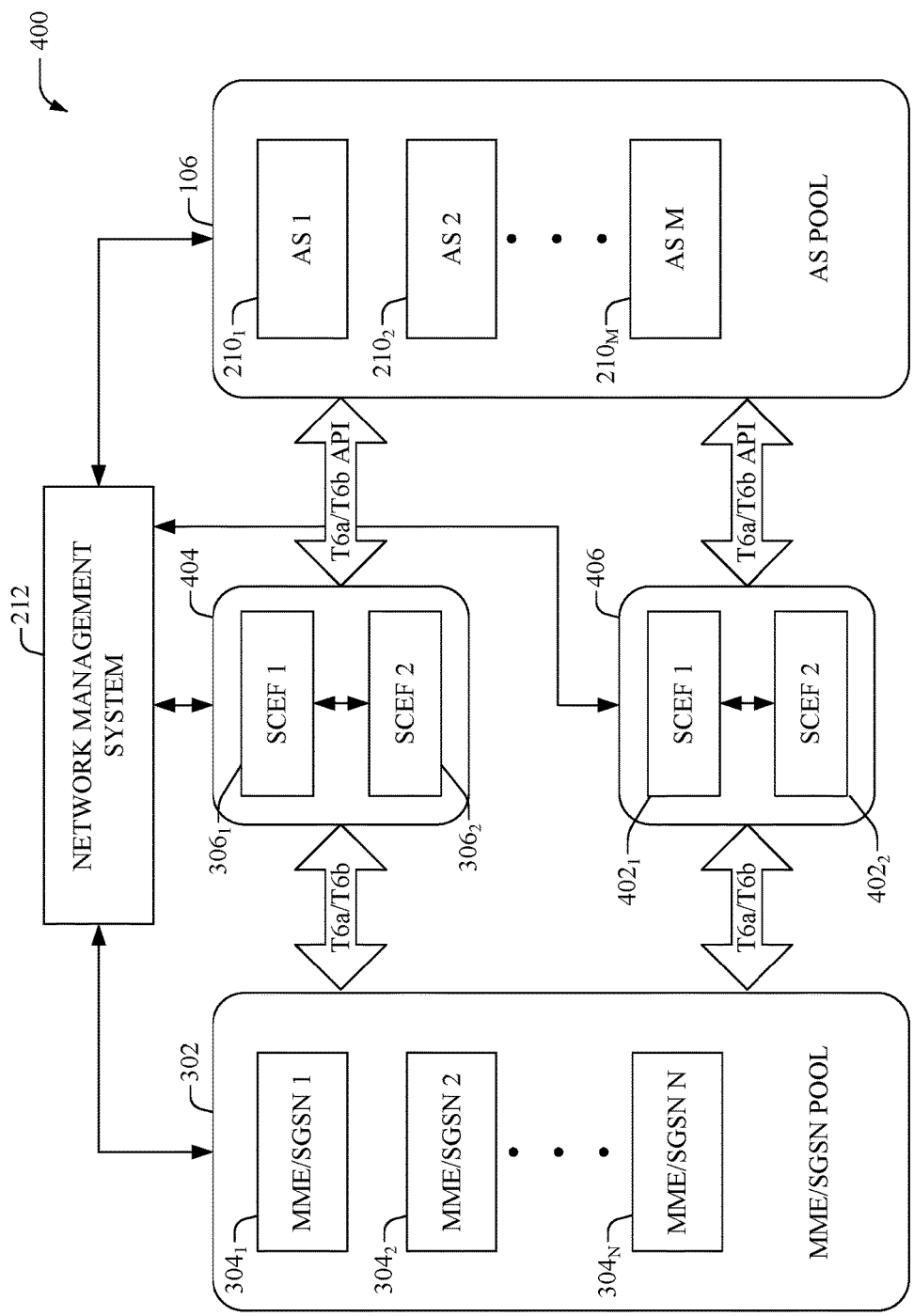
FIG. 4 illustrates an example system for providing redundancy during policy-based API generation.

Referring now to FIG. 4, there illustrated is an example system 400 for providing redundancy during policy-based API generation, according to an aspect of the subject disclosure. It is noted that the AS(s) 106, AS 1-AS M ($210_1$-$210_M$), network management system 212, MME/SGSN pool 302, MME/SGSN $304_1$-$304_N$, SCEF 1 $306_1$, and SCEF 2 $306_2$ can comprise functionality as more fully described herein, for example, as described above with regard to systems 100-300. In one embodiment, one or more additional sets of SCEFs, for example, SCEF 1 $402_1$ and SCEF 2 $402_2$ can be deployed in geo-redundant data centers (404, 406), for example, to account for disaster recovery. In an example scenario wherein SCEF 1 $306_1$ and/or SCEF 2 $306_2$ fail (and/or cannot perform at predefined performance thresholds), SCEF 1 $402_1$ and SCEF 2 $402_2$ can be activated and can handle all or portions of traffic from the MME/SGSN pool 302. In such complex networking scenarios, the MME/SGSN $304_1$-$304_N$ can conduct domain name system (DNS) procedures to select the closest SCEF entities (e.g., from SCEF 1 $306_1$, SCEF 2 $306_2$, SCEF 1 $402_1$, and/or SCEF 2 $402_2$) to complete signaling transactions. Although only one set of additional SCEFs (e.g., SCEF 1 $402_1$, and/or SCEF 2 $402_2$) are depicted, it is noted that the subject disclosure is not so limited and that more than one set of SCEFs can be deployed to provide additional geo-redundancy.

In one aspect, the network management system 212 can be used as a policy-based mapping engine that instructs the SCEFs (e.g., SCEF 1 $306_1$, SCEF 2 $306_2$, SCEF 1 $402_1$, and/or SCEF 2 $402_2$) to accept the interface traffic from the MME/SGSN pool 302 and steer it to the AS pool 106. In case of error conditions, for example, failover conditions, the network management system 212 is tightly coupled to its nodes to steer a specific API to the AS pool 106.

Figure 5:
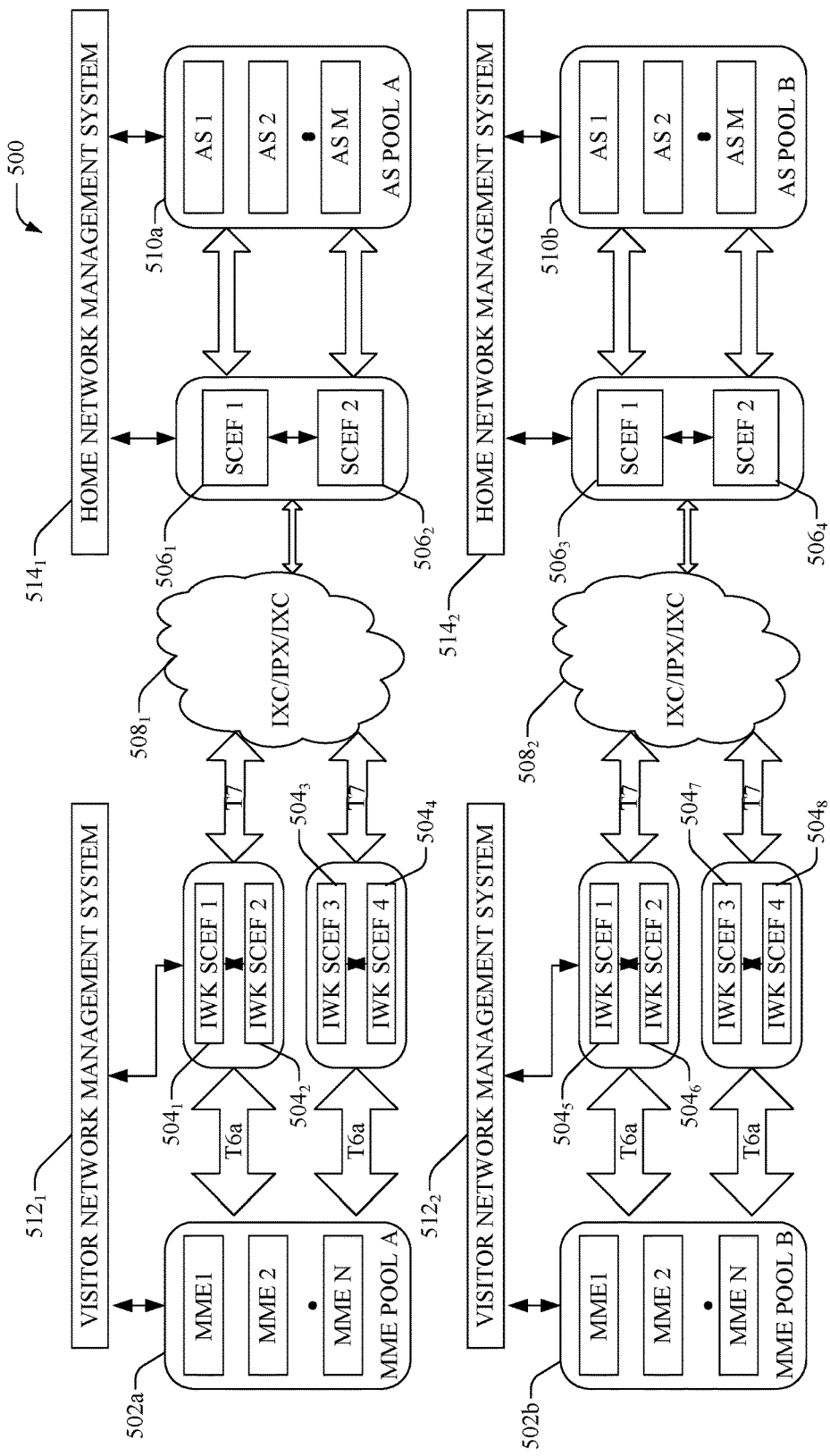
FIG. 5 illustrates an example system that facilitates routing of IoT roaming traffic via service capability exposure function (SCEF) interworking.

FIG. 5 illustrates an example system 500 that facilitates routing of IoT roaming traffic via SCEF interworking, according to aspects of the disclosed subject matter. In one aspect, the SCEF entity in the network handling home public land mobile network (PLMN) IoT users/devices can also support handling the IoT users/devices from a roaming partner. Large carrier networks typically have few hundreds of global roaming partners and the SCEF in the visited network for a roaming device is to effectively interwork with the SCEF in their home network to meet the demands of their home application/service providers while they are roaming outside of their home network. In a similar manner, when the home PLMN IoT users/devices roam outbound into their partnered roaming carrier, comparable service level behaviors based on applications can be provided on-demand when trying to establish connectivity and/or data traffic exchange with their home service providers. A standards based home routed network architecture design model depicted in FIG. 5 can be leveraged so that IoT devices get the same level of experience when they are in their home PLMN or while roaming in other networks.

Roaming IoT devices can couple to a visitor MME within an MME pool, for example, MME pool A $502a$ and/or MME pool B $502b$. The visitor MME can steer the IoT traffic to an interworking (IWK) SCEF function, for example, IWK SCEF 1-4 $504_1$-$504_8$. In one aspect, the IWK SCEF 1-4 $504_1$-$504_8$ can interfaces to the home SCEFs for example, SECF 1-2 $506_1$-$506_4$. In one example, the T6a traffic received from the visitor MME can be forwarded to the home SCEFs (e.g., SCEF 1-2 $506_1$-$506_4$) via a T7 diameter interface through the inter exchange carrier (IXC)/IP packet exchange (IPX) $508_1$-$508_2$. According to an embodiment, the IWK SCEF 1-4 $504_1$-$504_8$ can be substantially similar to and comprise functionality as more fully described herein, for example, as described herein with respect to SCEF 102. For its home PLMN devices, the IWK SCEF 1-4 $504_1$-$504_8$ can operate same as (or substantially similar to) the SCEF 102 by employing a PAW functionality to generate and expose interface agnostic APIs to external providers. For visitor devices, the IWK SCEF 1-4 $504_1$-$504_8$ can act as a relay point that forwards the traffic on the T7 interface to a home SCEF, for example, SCEF 1-2 $506_1$-$506_4$, which in turn perform the protocol agnostic wrapping and interface agnostic API exposition. It is noted that IWK SCEF functions (e.g., forwarding of received data) and regular SCEF functions (e.g., generation and exposition of APIs) can be implemented by same device and/or multiple devices, for example, independent virtual machines in a cloud architecture.

Although only two home and visitor networks are depicted in FIG. 5, it is noted that the subject disclosure is not that limited and greater or fewer number of networks can be implemented. It is noted that the MME pool A $502a$ and/or MME pool B $502b$ can be substantially similar to MME/SGSN pool 302 and can comprise functionality as more fully described herein, for example, as described above with regard to MME/SGSN pool 302. Further, the SCEF 1-2 $506_1$-$506_4$ can be substantially similar to SCEF 102 and comprise functionality as more fully described herein, for example, as described above with regard to SCEF 102. Furthermore, AS pool A $510a$ and AS pool B $510b$ can be substantially similar to AS pool 106 and comprise functionality as more fully described herein, for example, as described above with regard to AS pool 106. Additionally, the network managements systems-visitor network management system $512_1$-$512_2$ and home network management system $514_1$-$514_2$ can be substantially similar to network management system 212 and comprise functionality as more fully described herein, for example, as described above with regard to network management system 212. As an example, the network management systems can be centrally controlled.

Figure 6:
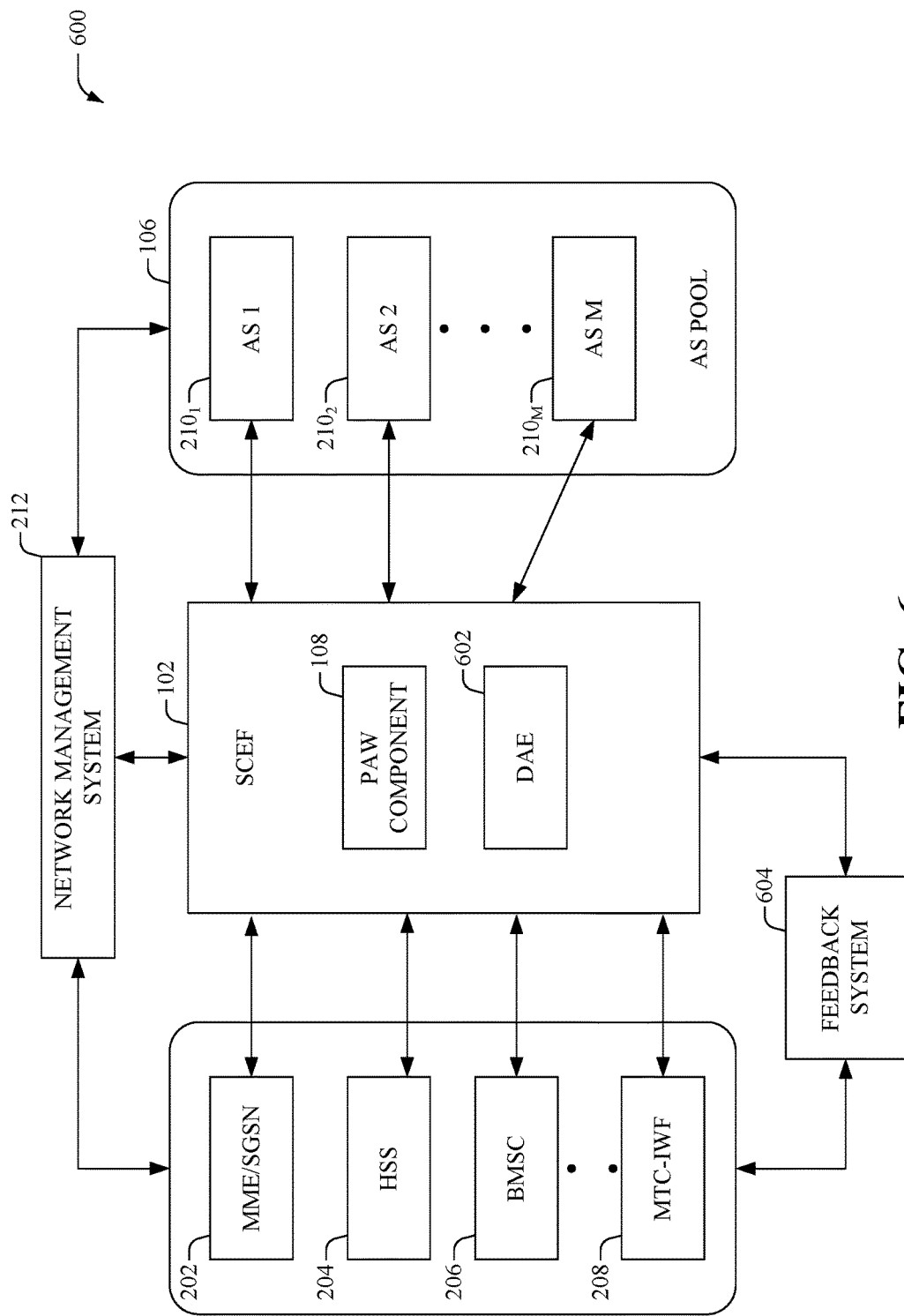
FIG. 6 illustrates an example system that comprises a SCEF integrated with a data analytics engine (DAE).

FIG. 6 illustrates an example system 600 that comprises an SCEF 102 integrated with a data analytics engine (DAE) 602 in accordance with the subject disclosure. The DAE 602 can work closely in conjunction with the PAW component 108 to facilitate tracking a specific set of operator-defined metrics that are associated with the application layer protocols being exposed from specific network elements (202-208). It is noted that the SCEF 102, AS pool 106, PAW component 108, MME/SGSN 202, HSS 204, BMSC 206, MTC-IWF 208, AS 1-M $210_1$-$210_M$, and network management system 212 can comprise functionality as more fully described herein, for example, as described above with regard to systems 100-400.

In one aspect, the DAE 602 can expose specific set of metrics to specific set of industry verticals. For example, an automotive AS can request data representing IoT devices' geographical location, an e-health AS can request specific health related info from the IoT devices, etc. Moreover, the AS 1-M $210_1$-$210_M$ can utilize the DAE 602 to extract more refined information from a specific network element. The DAE 602 can provide the information as an on-demand API, for example, by employing the PAW component 108. In one embodiment, the DAE 602 can communicate with the network management system 212 to extract the configuration of the network elements (e.g., 202-208), their interface as well as protocol states towards the SCEF 102 and ensure that the exposed APIs and analytics in real-time truly reflect the network entities that are available on-demand for access by a given application provider. The application provider in turn can use these APIs to be able to perform on demand triggers for desired set of IoT devices in a given geographic region, as well as request event based configuration, reporting, status monitoring, deletion, new services rollout with an existing device, and/or launch of new devices in specific locations given the capabilities supported in the network. Further, a closed loop feedback system 604 can be utilized within each of the independent network elements (e.g., 202-208) to enable the SCEF 102 to intelligently control the traffic from the network elements in a manner such that the SCEF 102 does not get saturated and can expose the APIs in a timely manner.

Figure 7:
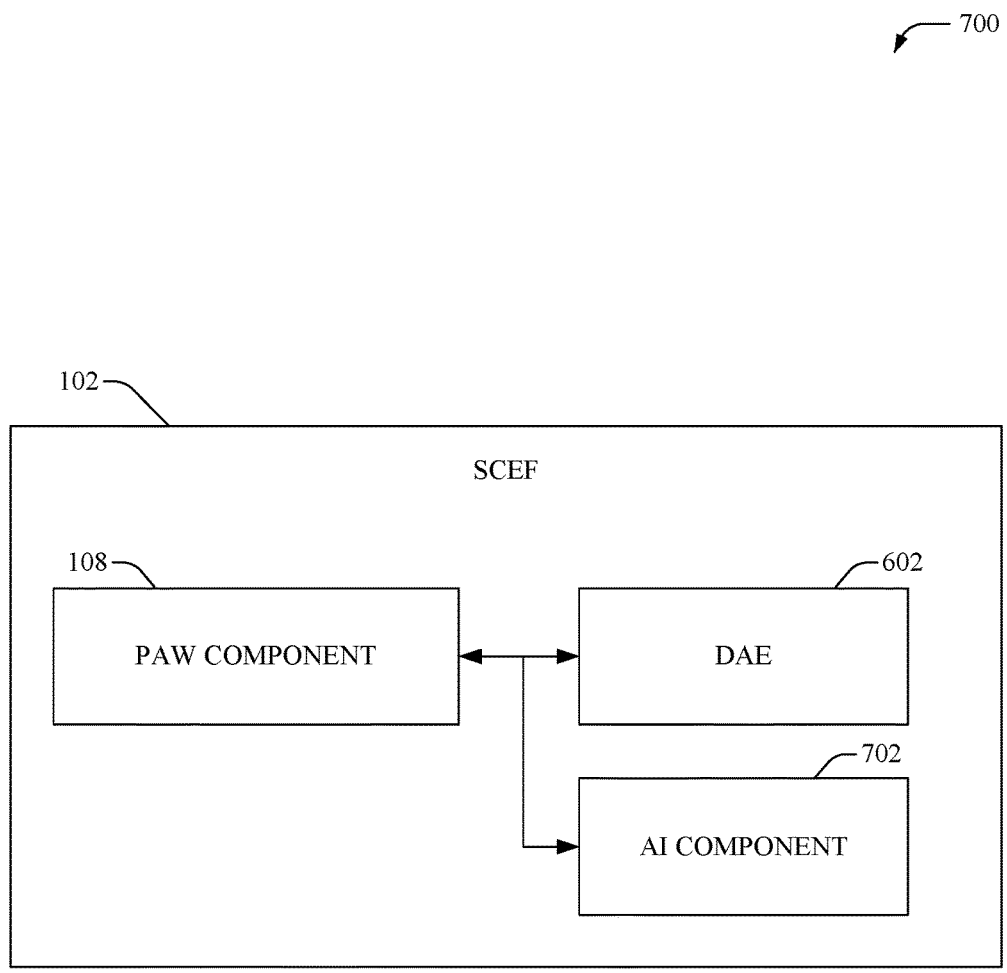
FIG. 7 illustrates an example system that facilitates automating one or more features in accordance with the subject embodiments.

Referring now to FIG. 7, there illustrated is an example system 700 that employs an artificial intelligence (AI) component (702) to facilitate automating one or more features in accordance with the subject embodiments. It can be noted that the SCEF 102, PAW component 108, and DAE 602 can comprise functionality as more fully described herein, for example, as described above with regard to systems 100-600.

In an example embodiment, system 700 (e.g., in connection with automatically developing and/or exposing APIs) can employ various AI-based schemes (e.g., intelligent processing/analysis, machine learning, etc.) for carrying out various aspects thereof. For example, a process for determining which APIs to expose, determining optimal APIs for specific type of traffic, determining metrics that are to be tracked, etc. can be facilitated via an automatic classifier system implemented by AI component 702. Moreover, the AI component 702 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 702 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 702 can be used to automatically learn and perform a number of functions, comprising but not limited to determining according to a predetermined criteria, protocol agnostic APIs that are to be exposed, metrics that are associated with the application layer protocols being exposed from network elements, etc. The criteria can comprise, but is not limited to, historical patterns and/or trends, network operator preferences and/or policies, application/service provider preferences, predicted traffic flows, event data, latency data, reliability/availability data, current time/date, and the like.

According to an embodiment, the network architecture disclosed herein provides several non-limiting advantages and features such as, but not limited to, (i) maintaining technology leadership and competitive edge in the IoT eco-system for disruptive applications/services delivery over the world class mobility infrastructure; (ii) providing a common SCEF entity towards the network elements in the mobility core network that provides intelligent and/or flexible connectivity to the physical/virtual core network elements; (iii) providing a common SCEF entity acting as a gateway access to the external application and/or service provider community via operator defined set of APIs exposed securely; (iv) providing an integrated SCEF analytics capability (e.g., via the DAE 602) that provides value added and event based services to the external providers for targeted IoT devices and network analytics on demand; (v) utilizing the analytics information to develop new services and create new revenue sources that mutually benefit infrastructure and application providers; (vi) providing a robust interworking of SCEF with its peer network entities and application providers to complete high volume IoT transactions in a cost-effective manner; (vii) maintaining a superior customer experience across IoT industry verticals that leverage best in class LTE based mobility network infrastructure; (viii) supporting global IoT roaming with efficient SCEF interworking to create effortless connectivity and enhance the overall user experience; (ix) successfully managing growth resulting from explosion of IoT device volumes via dynamic network reconfiguration, expansion via virtual networking functions, roll out of new services and business models; (x) leveraging distributed and/or pooled SCEF architecture designs for intelligent application layer protocol conversions and securely expose a configurable set of APIs to third party providers; (xi) proactive and intelligent monitoring inherent in SCEF for potential failure detection and/or dynamic re-routing of the APIs to minimize network failure conditions and external provider's on-demand access to the network resources; etc.

Figure 8:
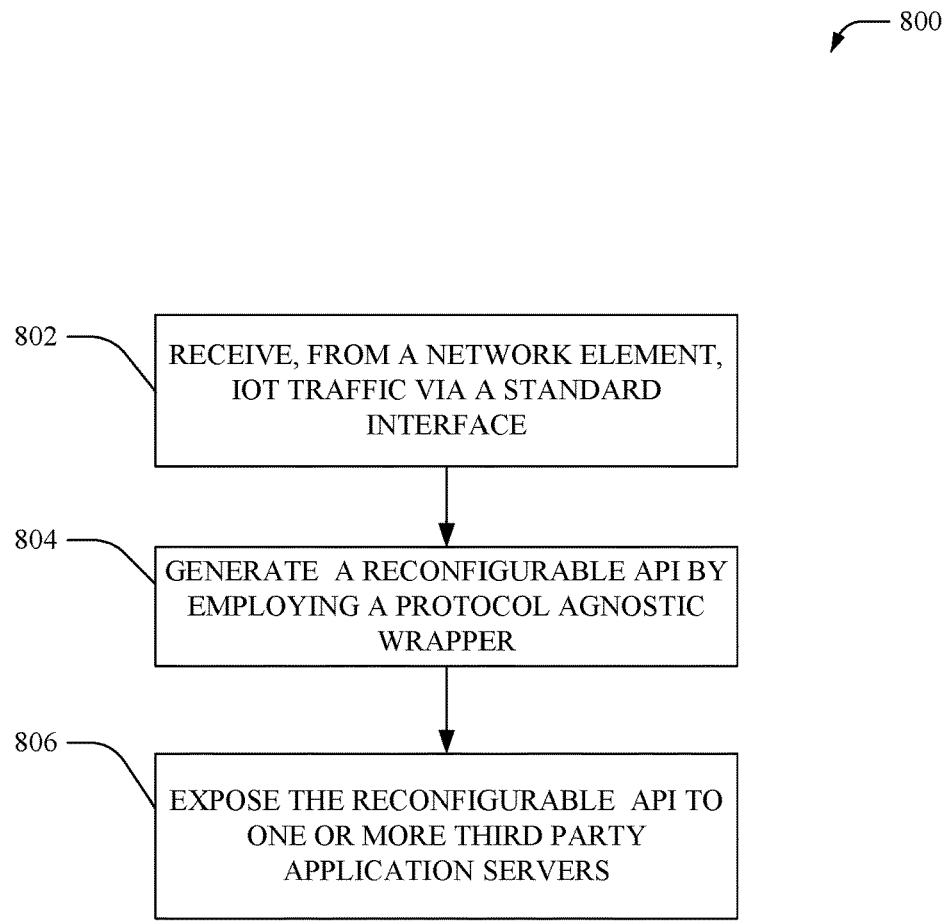
FIG. 8 illustrates an example method that facilitates protocol agnostic wrapping of traffic associated with IoT devices during API generation.
Figure 9:
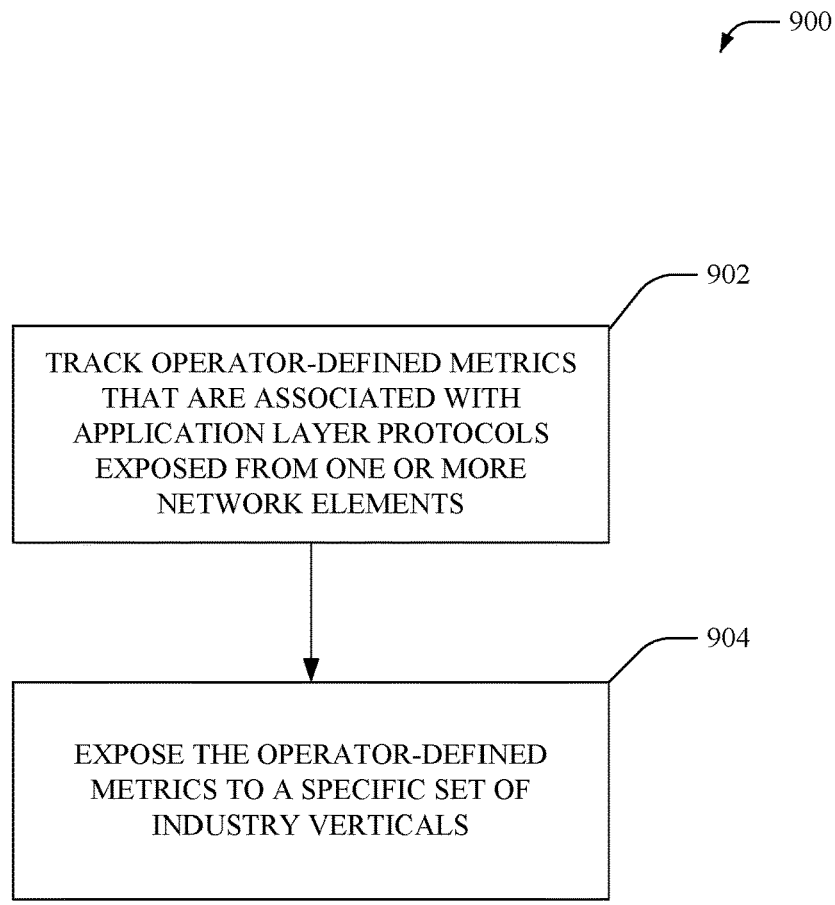
FIG. 9 illustrates an example method that facilitates integrating data analytics capabilities in a SCEF

FIGS. 8-9 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8 there illustrated is an example method 800 that facilitates protocol agnostic wrapping of traffic associated with IoT devices during API generation, according to an aspect of the subject disclosure. In an aspect, method 800 can be implemented by one or more network devices (e.g., SECF 102) of a communication network (e.g., cellular network). Telecommunication equipment manufacturers are developing advanced wireless networking products with innovative software feature capabilities as plug-ins and/or configurable APIs for distribution to third party vendors, applications, and/or service providers accessing such APIs exposed by the carriers can mutually benefit from such advanced networking solutions. Network carriers can differentiate their IoT services offering by providing unique value additions in securely exposing a generic set of APIs that can offer event based monitoring, reporting, and/or triggering mechanisms for global IoT service providers who in turn can use such useful data from operators to spin new services and/or create revenues that benefit both worlds. Moreover, global wireless operators as well as applications and/or services providers in the IoT industry benefit from each other with the intelligent access capabilities made available by the mobility network elements.

At 802, IoT traffic can be received from a network element (e.g., MME/SGSN, HSS, BMSC, MTC-IWF, etc.) via a standard interface (e.g., diameter interface). At 804, a protocol agnostic wrapper function can be utilized to generate a reconfigurable API. Further, at 806, the reconfigurable API can be exposed to one or more third party application providers. Moreover, network carriers can expose APIs associated with their network elements signaling interfaces to external applications and/or service providers with suitable agreements in place thereby enabling custom APIs using open source tools to create new portals and/or services. Such a model can create a truly globally connected world where users can leverage best in class mobility network infrastructure to get connected, come online, collaborate and/or share via social network evolution in turn creating new service and revenue opportunities.

FIG. 9 illustrates an example method 900 that facilitates integrating data analytics capabilities in a SCEF, according to an aspect of the subject disclosure. As an example, method 900 can be implemented by one or more network devices (e.g., SCEF 102) of a communication network (e.g., cellular network). Service providers can establish location specific IoT device triggers and/or monitoring with a desired level of accuracy, collect raw data, extract analytics associated with their functional and operational aspects in the network that could in turn be used to develop intelligent business metrics, innovate revenue generation model from data analytics, and/or streamline operations as well as location based targeted consumer services where appropriate. Integrated SCEF data analytics capability provides value-added and/or event-based services to the external providers for targeted IoT devices and network analytics on demand.

At 902, operator-defined metrics that are associated with application layer protocols exposed from one or more network elements (e.g., MME/SGSN, HSS, BMSC, MTC-IWF, etc.) can be tracked. Further, at 904, the operator-defined metrics can be exposed to a specific set of industry verticals. As an example, the operator-defined metrics can be utilized to develop new services and/or create new revenue sources that mutually benefit carrier infrastructure and application providers.

Figure 10:
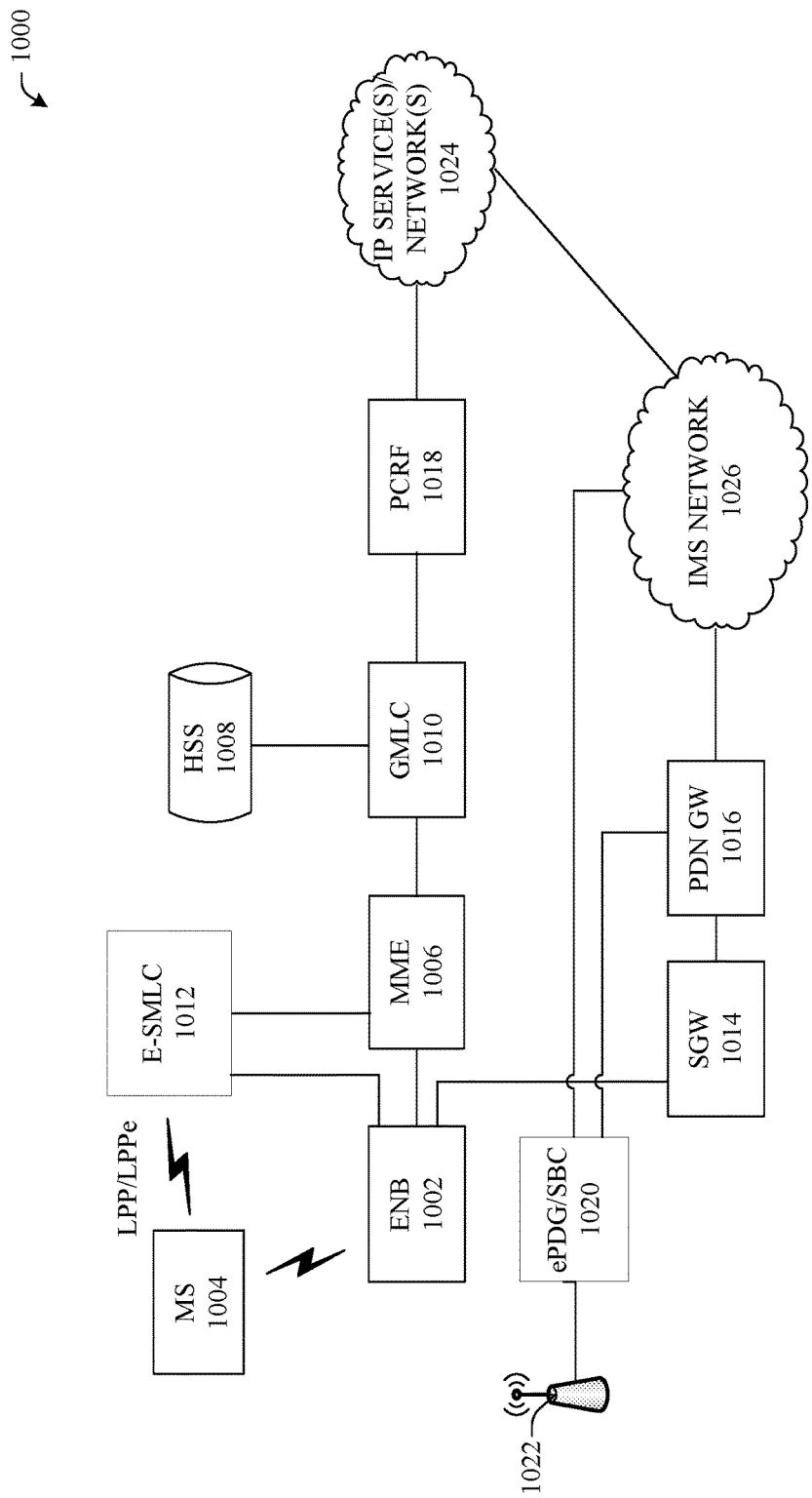
FIG. 10 illustrates a Long Term Evolution (LTE) network architecture that can employ the disclosed architecture.

FIG. 10 illustrates a high-level block diagram that depicts an example LTE network architecture 1000 that can employ the disclosed communication architecture. In one aspect, network architecture 1000 can comprise at least a portion of systems 100-600. The evolved RAN for LTE consists of an eNodeB (eNB) 1002 that can facilitate connection of MS 1004 to an evolved packet core (EPC) network. In one aspect, the MS 1004 is physical equipment or Mobile Equipment (ME), such as a mobile phone or a laptop computer that is used by mobile subscribers, with a Subscriber identity Module (SIM). The SIM comprises an International Mobile Subscriber Identity (IMSI) and/or MSISDN, which is a unique identifier of a subscriber. The MS 1004 comprises an embedded client that receives and processes messages received by the MS 1004. As an example, the embedded client can be implemented in JAVA.

The connection of the MS 1004 to the evolved packet core (EPC) network is subsequent to an authentication, for example, a SIM-based authentication between the MS 1004 and the evolved packet core (EPC) network. In one aspect, the MME 1006 provides authentication of the MS 1004 by interacting with the Home Subscriber Server (HSS) 1008 via a Gateway Mobile Location Centre (GMLC) 1010. The GMLC 1010 can request routing information from the HSS 1008. The HSS 1008 contains a subscriber profile and keeps track of which core network node is currently handling the subscriber. It also supports subscriber authentication and authorization functions (AAA). In networks with more than one HSS 1008, a subscriber location function provides information on the HSS 1008 that contains the profile of a given subscriber. In one aspect, this authentication can be utilized to secure population of the user/device profile data by a primary user. Further, the MME 1006 can be coupled to an enhanced Serving Mobile Location Center (E-SMLC) 1012 supports location services (LCS) and coordinates positioning of the MS 1004. The MS 1004 and the E-SMLC can communicate using an LTE Positioning Protocol (LPP) and/or LPP extensions (LPPe)

As an example, the eNB 1002 can host a PHYsical (PHY), Medium Access Control (MAC), Radio Link Control (RLC), and Packet Data Control Protocol (PDCP) layers that comprise the functionality of user-plane header-compression and encryption. In addition, the eNB 1002 can implement at least in part Radio Resource Control (RRC) functionality (e.g., radio resource management, admission control, scheduling, cell information broadcast, etc.). The eNB 1002 can be coupled to a serving gateway (SGW) 1014 that facilitates routing of user data packets and serves as a local mobility anchor for data bearers when the MS 1004 moves between eNBs. The SGW 1014 can act as an anchor for mobility between LTE and other 3GPP technologies (GPRS, UMTS, etc.). When MS 1004 is in an idle state, the SGW 1014 terminates a downlink (DL) data path and triggers paging when DL data arrives for the MS 1004. Further, the SGW 1014 can perform various administrative functions in the visited network such as collecting information for charging and lawful interception. In one aspect, the SGW 1014 can be coupled to a Packet Data Network Gateway (PDN GW) 1016 that provides connectivity between the MS 1004 and external packet data networks such as IP service(s)/ network(s) 1024 via the IP Multimedia Subsystem (IMS) network 1026. Moreover, the PDN GW 1016 is a point of exit and entry of traffic for the MS 1004. It is noted that the MS 1004 can have simultaneous connectivity with more than one PDN GW (not shown) for accessing multiple PDNs.

The PDN GW 1016 performs IP address allocation for the MS 1004, as well as QoS enforcement and implements flow-based charging according to rules from a Policy Control and Charging Rules Function (PCRF) 1018. The PCRF 1018 can facilitate policy control decision-making and control flow-based charging functionalities in a Policy Control Enforcement Function (PCEF), which resides in the PDN GW 1016. The PCRF 1018 can store data (e.g., QoS class identifier and/or bit rates) that facilitates QoS authorization of data flows within the PCEF. In one aspect, the PDN GW 1016 can facilitate filtering of downlink user IP packets into the different QoS-based bearers and perform policy enforcement, packet filtering for each user, charging support, lawful interception and packet screening. Further, the PDN GW 1016 acts as the anchor for mobility between 3GPP and non-3GPP technologies such as WiMAX and 3GPP2 (CDMA 1x and EvDO). An Evolved Packet Data Gateway (ePDG) 1020 is employed for communications between the EPC and untrusted non-3GPP networks that require secure access, such as a Wi-Fi, LTE metro, and femtocell access networks, for example served by access point 1022.

Although an LTE network architecture 1000 is described and illustrated herein, it is noted that most any communication network architecture can be utilized to implement the disclosed embodiments.

Figure 11:
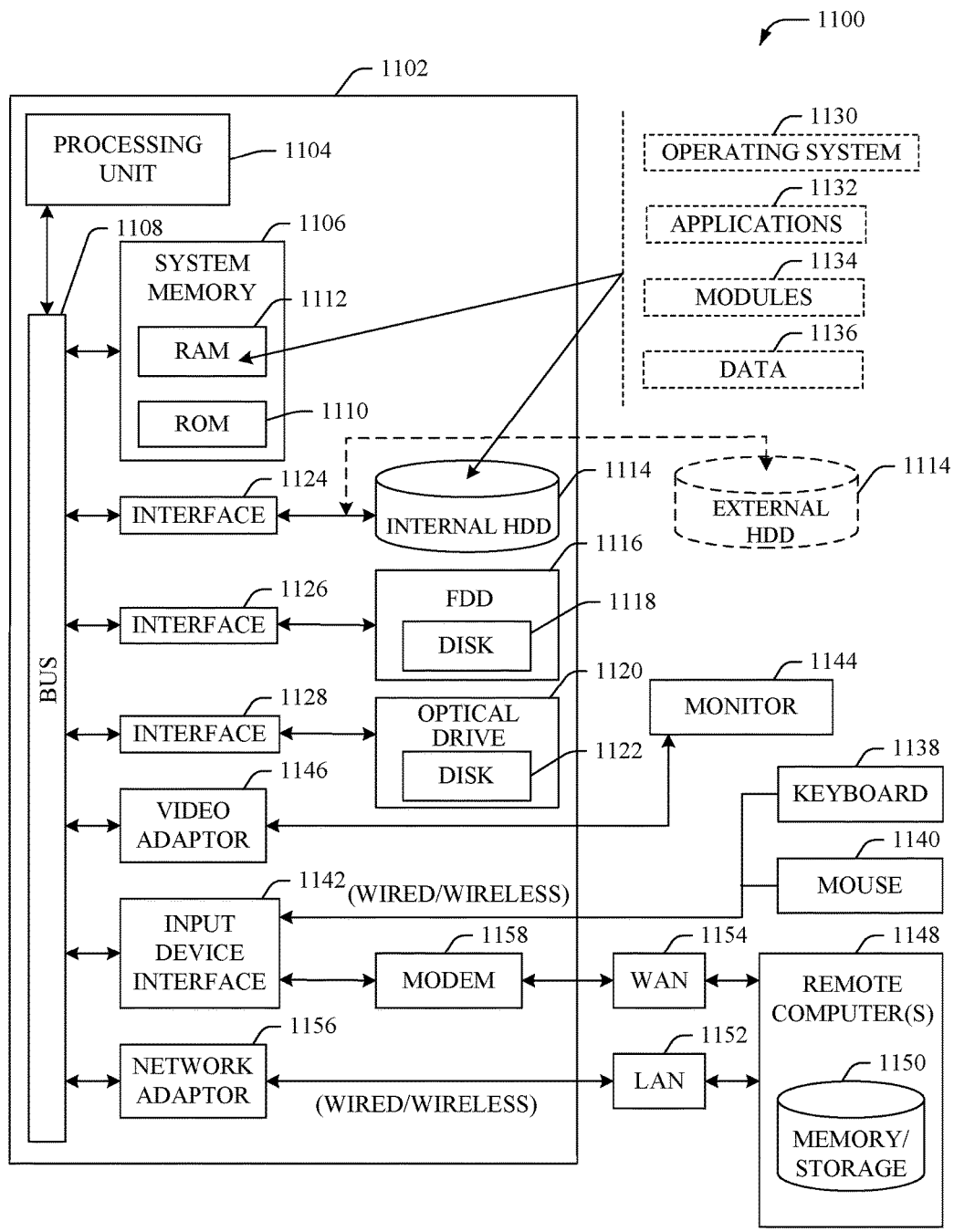
FIG. 11 illustrates a block diagram of a computer operable to execute the disclosed communication architecture.

Referring now to FIG. 11, there is illustrated a block diagram of a computer 1102 operable to execute the disclosed communication architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), application(s) server(s), equipment, system(s), interface(s), gateway(s), controller(s), node(s), engine(s), entity(ies), function(s) and/or device(s) (e.g., SCEF 102, control plane entity(ies) 104, ASs 106, PAW component 108, MME/SGSN 202, HSS, 204, BMSC 206, MTC-IWF 208, AS 1-AS M $210_1$-$210_M$, network management system 212, MME/SGSN pool 302, MMEs $304_1$-$30_M$, SCEF 1-2 $306_1$-$306_2$, SCEF 1-2 $402_1$-$402_2$, MME pool A 502a, MME pool B 502b, IWK SCEF 1-4 $504_1$-$504_8$, SCEF 1-2 $506_1$-$506_4$, AS pool A 510a, AS pool B 510b, visitor network management system $512_1$-$512_2$, home network management system $514_1$-$514_2$, DAE 602, feedback system 604, AI component 702, ENB 1002, MS 1004, MME 1006, HSS 1008, GMLC 101, E-SMLC 1012, SGW 1014, PDN GW 1016, PCRF 1018, IP service/networks 1024, IMS network 1026, etc.) disclosed herein with respect to systems 100-700 and 1000 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
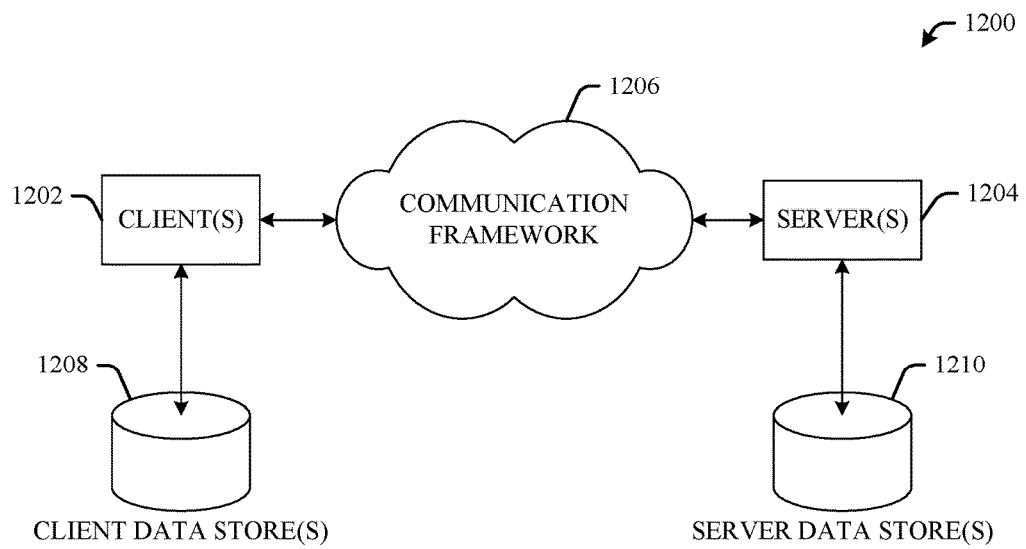
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 comprises one or more client(s) 1202. The client(s) 1202 can be hardware and/or software (e.g., threads, processes, computing devices).

The system 1200 also comprises one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may comprise a cookie and/or associated contextual information, for example. The system 1200 comprises a communication framework 1206 (e.g., a global communication network such as the Internet, cellular network, etc.) that can be employed to facilitate communications between the client(s) 1202 and the server(s) 1204.

Communications can be facilitated via a wired (comprising optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining a configurable application programming interface that facilitates display of data for a control plane device of a communication network to a third-party application server device that is external to the communication network;
   mapping an application layer protocol for the control plane device into the data for the control plane device; and
   based on the mapping of the application layer protocol for the control plane device, facilitating a communication of user equipment data, associated with a user equipment served by the control plane device, from the control plane device to the third-party application server device, wherein the user equipment data facilitates determination of a targeted service that is to be provided to the user equipment.

2. The system of claim 1, wherein the user equipment comprises a machine-to-machine device.

3. The system of claim 1, wherein the targeted service comprises a device triggering service that provides a trigger to the user equipment.

4. The system of claim 1, wherein the targeted service comprises a device monitoring service that tracks parameters associated with the user equipment.

5. The system of claim 1, wherein the configurable application programming interface is a protocol agnostic application programming interface.

6. The system of claim 1, wherein the determining the configurable application programming interface comprises determining the configurable application programming interface based on a translation of application layer protocols.

7. The system of claim 1, wherein the configurable application programming interface facilitates access to the control plane device based on policy data indicative of a security policy associated with the communication network.

8. The system of claim 1, wherein the determining the configurable application programming interface comprises determining the configurable application programming interface based on network traffic data.

9. The system of claim 1, wherein the determining the configurable application programming interface comprises determining the configurable application programming interface based on interface data associated with an industry-defined interface utilized by the control plane device.

10. The system of claim 1, wherein the configurable application programming interface comprises a first configurable application programming interface that is utilized to expose the control plane device to the third-party application server device during a first time period, and wherein the operations further comprise:
   during a second time period, determining a second configurable application programming interface that facilitates access of the control plane device to the third-party application server device.

11. A method, comprising:
   determining, by a gateway device comprising a processor, a configurable application programming interface that facilitates display of first information for a control plane device of a communication network to a third-party application server device that is external to the communication network;
   mapping an application layer protocol for the control plane device into the first information for the control plane device; and
   based on the configurable application programming interface, facilitating, by the gateway device, a transfer of second information, associated with a user equipment served by the control plane device, between the control plane device and the third-party application server device, wherein the second information is to be utilized to establish a targeted service associated with the user equipment.

12. The method of claim 11, wherein the determining comprises determining a protocol-independent application programming interface.

13. The method of claim 11, wherein the configurable application programming interface is a first configurable application programming interface and the method further comprises:
   reconfiguring, by the gateway device, the first configurable application programming interface to generate a second configurable application programming interface that facilitates access of the control plane device to the third-party application server device.

14. The method of claim 13, wherein the reconfiguring comprises reconfiguring the first configurable application programming interface based on determining a change in a type of data received from the control plane device.

15. The method of claim 13, wherein the reconfiguring comprises reconfiguring the first configurable application programming interface based on network traffic data.

16. The method of claim 13, wherein the reconfiguring comprises reconfiguring the first configurable application programming interface based on determining a change in an amount of data received from the control plane device.

17. A non-transitory machine-readable storage medium, comprising executable instructions that, when executed by a processor, facilitate performance of operations, comprising:
   configuring a protocol-agnostic application programming interface that facilitates display of a data set of a control plane device of a communication network to a third-party application server device that is external to the communication network;
   mapping an application layer protocol for the control plane device into the data set for the control plane device; and
   facilitating, via the protocol-agnostic application programming interface, a transfer of information, associated with a user equipment served by the control plane device, between the control plane device and the third-party application server device, wherein the transfer facilitates an implementation of a targeted service associated with the user equipment.

18. The non-transitory machine-readable storage medium of claim 17, wherein the user equipment comprises an Internet of thing device.

19. The non-transitory machine-readable storage medium of claim 17, wherein the configuring comprises configuring the protocol-agnostic application programming interface based on network traffic data.

20. The non-transitory machine-readable storage medium of claim 17, wherein the configuring comprises configuring the protocol-agnostic application programming interface based on type data indicative of a type of the control plane device.

\* \* \* \* \*